(12) United States Patent
Yu

(10) Patent No.: US 8,120,691 B2
(45) Date of Patent: Feb. 21, 2012

(54) IMAGE CAPTURING APPATATUS AND METHOD FOR USE IN A MOBILE TERMINAL

(75) Inventor: Hyung-Seok Yu, Seoul (KR)

(73) Assignee: Samsung Electronics Co., Ltd (KR)

( * ) Notice: Subject to any disclaimer, the term of this patent is extended or adjusted under 35 U.S.C. 154(b) by 885 days.

(21) Appl. No.: 11/728,423

(22) Filed: Mar. 26, 2007

(65) Prior Publication Data

US 2007/0236593 A1 Oct. 11, 2007

(30) Foreign Application Priority Data

Mar. 29, 2006 (KR) .................. 10-2006-0028195

(51) Int. Cl.
*H04N 5/222* (2006.01)

(52) U.S. Cl. ............ 348/333.01; 348/333.11; 348/208.1

(58) Field of Classification Search ............... 348/333.01–333.12, 3, 33.1, 154, 348/155, 169, 208.2, 222.1, 208.14, 352, 348/359, 231.99
See application file for complete search history.

(56) References Cited

U.S. PATENT DOCUMENTS

| | | | | |
|---|---|---|---|---|
| 4,541,010 A * | 9/1985 | Alston | | 348/283 |
| 6,233,015 B1 * | 5/2001 | Miller et al. | | 348/333.05 |
| 2001/0002142 A1 * | 5/2001 | Akiyama et al. | | 348/222 |
| 2001/0005231 A1 * | 6/2001 | Kubo | | 348/341 |
| 2001/0019362 A1 * | 9/2001 | Nakamura et al. | | 348/222 |
| 2003/0112473 A1 * | 6/2003 | Robins et al. | | 358/463 |
| 2003/0174228 A1 * | 9/2003 | Brake et al. | | 348/333.11 |
| 2003/0218682 A1 * | 11/2003 | Lim et al. | | 348/333.11 |
| 2004/0212687 A1 * | 10/2004 | Patwari | | 348/211.13 |
| 2005/0094000 A1 * | 5/2005 | Son et al. | | 348/231.99 |
| 2005/0206658 A1 * | 9/2005 | Fagans | | 345/660 |
| 2006/0152595 A1 * | 7/2006 | Ryu et al. | | 348/220.1 |
| 2006/0176387 A1 * | 8/2006 | Kobayashi | | 348/333.01 |
| 2006/0268129 A1 * | 11/2006 | Deng | | 348/239 |
| 2007/0130602 A1 * | 6/2007 | Gulli et al. | | 725/113 |
| 2007/0236593 A1 * | 10/2007 | Yu | | 348/333.01 |
| 2008/0211941 A1 * | 9/2008 | Deever et al. | | 348/262 |

* cited by examiner

*Primary Examiner* — Tuan Ho
*Assistant Examiner* — Kent Wang
(74) *Attorney, Agent, or Firm* — The Farrell Law Firm, P.C.

(57) ABSTRACT

Provided are an image capturing apparatus and method for use in a mobile terminal. The image capturing method includes when an image capturing menu is selected during a preview operation, pausing the preview operation; releasing an image sub-processing of the preview operation; and resuming the preview operation and capturing the image. Accordingly, the mobile terminal can minimize the difference between the preview operation stop time and the capture time, which may be generated by the data processing time increased during capturing the image at high pixel resolution. Therefore, the mobile terminal can provide the captured image naturally.

12 Claims, 4 Drawing Sheets

IMAGE CAPTURING APPATATUS AND METHOD FOR USE IN A MOBILE TERMINAL

PRIORITY

This application claims priority under 35 U.S.C. §119 to an application entitled "Image Capturing Appatatus And Method For Use In Mobile Terminal" filed in the Korean Intellectual Property Office on Mar. 29, 2006 and assigned Ser. No. 2006-28195, the contents of which are incorporated herein by reference.

BACKGROUND OF THE INVENTION

1. Field of the Invention

The present invention relates generally to an image capturing apparatus and method for use in an image in a mobile terminal, and in particular, an image capturing apparatus and method for minimizing a display stop time generated during image capturing.

2. Description of the Related Art

In recent years, most mobile terminals tend to basically have a digital camera function that can capture an image at a high pixel resolution, for example, a five-mega pixel resolution or higher. Digital cameras built in the mobile terminals take a photograph using a preview operation and an image capturing process. The preview operation is a process of displaying an image inputted through a camera sensor on an external display device, and the image capturing process is a process of capturing a specific still image. In order to minimize the processing speed delay caused by an increase in an amount of data when capturing an image at a high pixel resolution, most digital cameras display frames at high speed by reducing the amount of data using an auxiliary method during the preview operation. Examples of the auxiliary method include a sub-sampling method, an omitting method, and a windowing method. The sub-sampling method is to output all frames of the image signals input through the camera sensor by reducing a vertical resolution of the image signals. The omitting method is for outputting the image signals by omitting a predetermined number of frames at regular intervals. The windowing method is for outputting only the image signals corresponding to a specific portion of the frame. Upon selection of an image capture key, an entire amount of the data is received and an image capture process is performed for capturing the corresponding image.

FIG. 1 is a flowchart diagram illustrating an image capturing process of a conventional mobile terminal. An example of the image capturing process is where the sub-sampling method is used during the preview operation.

Referring to FIG. 1, during the preview operation when a capture of a still image is selected using the sub-sampling method (101), the preview operation is stopped (103) and the sub-sampling is released (105). Then, an image capture process is performed to capture a specific still image inputted through a camera sensor (107), and the image capture is done after a predetermined time (109).

In order to stop the preview operation, a data processing time indicated by "a" period 120 is required. In order to release and stabilize the sub-sampling, a data processing time indicated by "b" period 122 is required. The data processing time increases in proportion to the pixel resolution. In the case of 2-3 mega pixel resolution, more than five seconds are required for the data processing.

The preview operation is stopped during the data processing time (i.e., "a" period+"b" period), so that the image signal inputted through the camera sensor is not displayed on the external display device. The conventional mobile terminal displays one of a stopped image during the preview operation stop time, and another image so as to hide the stopped image. In this case, a user has to wait until an image is captured, while viewing the stopped display image or the specific image during the preview stop time that is proportional to the pixel resolution. If the mobile terminal moves immediately after the user issues a capture command, that is, before the image is captured after the preview is stopped, the stopped preview image is quite different from an actually captured image.

SUMMARY OF THE INVENTION

An object of the present invention is to substantially solve at least the above problems and/or disadvantages and to provide at least the advantages below. Accordingly, an object of the present invention is to provide an image capturing apparatus and method for use in a mobile terminal.

Another object of the present invention is to provide an image capturing apparatus and method for minimizing a display stop time generated during image capturing.

According to one aspect of the present invention, provided is an image capturing method for use in a mobile terminal that includes when an image capture menu is selected during a preview operation, pausing the preview; releasing an image sub-processing of the preview; and resuming the preview and capturing the image.

According to another aspect of the present invention, provided is an image capturing method for use in a mobile terminal that includes when an image capture menu is selected during a preview operation, pausing the preview; resuming the preview operation by processing entire image signals inputted from a camera sensor; and capturing the image.

According to a further aspect of the present invention, provided is an image capturing apparatus for use in a mobile terminal that includes a camera module for outputting an image signal input through a camera sensor; a display unit for displaying the inputted image signal; a control unit for detecting an image capture event to output an image capture signal; and an image processor for performing a preview by outputting an input image signal to the display unit, pausing the preview operation when the image capture signal is input, releasing an image sub-processing performed during the preview operation, resuming the paused preview operation, and capturing the image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an image capturing apparatus and method for minimizing a display stop time during an image capturing process in a mobile terminal will be described in detail. An example of the image capturing process is where a sub-sampling method is used as an auxiliary method for displaying frames at high speed by reducing an amount of data during a preview operation. However, it is apparent that the present invention can also be applied to an omitting method and a windowing method.

Figure 1:
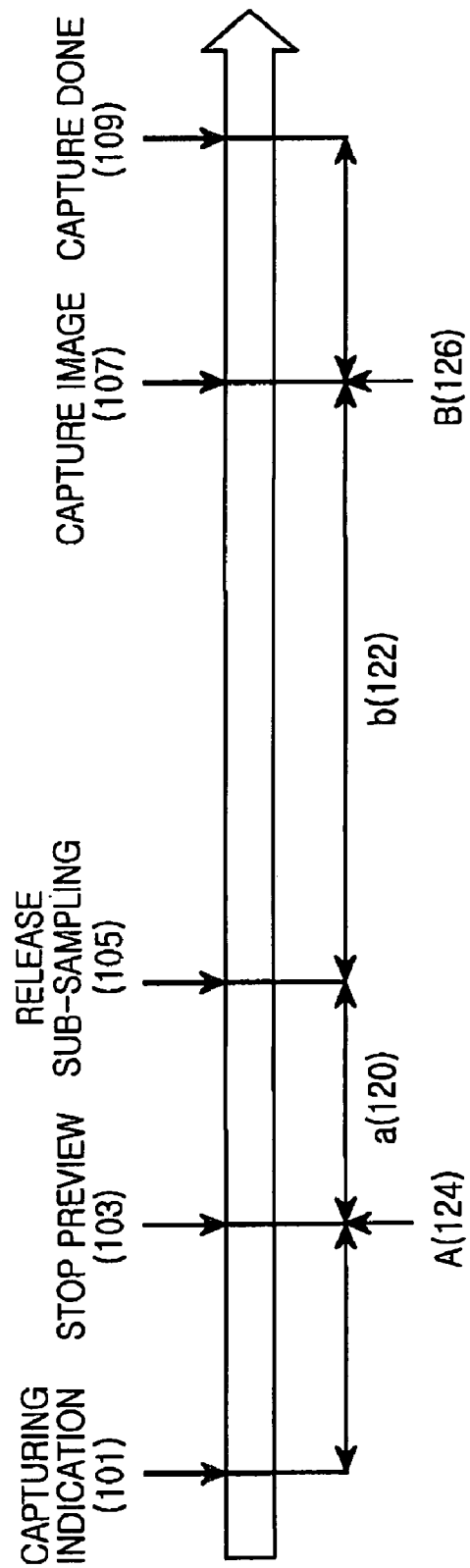
FIG. 1 is a flowchart illustrating an image capturing process of a conventional mobile terminal.
Figure 2:
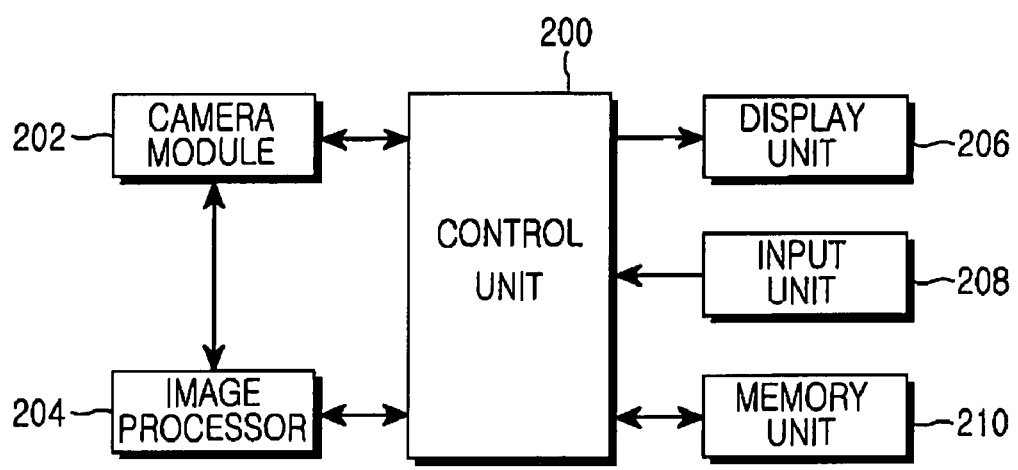
FIG. 2 is a block diagram of a mobile terminal according to the present invention.

FIG. 2 is a block diagram of a mobile terminal according to the present invention. The mobile terminal includes a control unit (e.g., a microprocessor unit (MPU)) 200, a camera module 202, an image processor 204, a display unit 206, an input unit 208, and a memory unit 210.

Referring to FIG. 2, the control unit 200 processes and controls voice communication and data communication. When an image capture mode is selected by a users' key manipulation during a preview operation, the control unit 200 outputs an image capture command to the image processor 204 so as to control an image capture function.

The camera module 202 includes a camera sensor (not shown) and a signal processor (not shown). The camera sensor converts an optical signal into an electric signal, and the signal processor converts an analog image signal generated from the camera sensor into digital data. The camera sensor may be a Charge Coupled Device (CCD) sensor and the signal processor may be a Digital Signal Processor (DSP).

The image processor 204 processes an image signal outputted from the camera module 202 on a frame basis and outputs the processed image signal according to a characteristic and a size of the display unit 206. The image processor 204 includes a video Coder-Decoder (CODEC) (not shown). The video CODEC codes the image signal using a set method, or decodes a coded frame image data into original frame image data. Specifically, upon inputting the image capture command from the control unit 200, a preview operation that is currently operating is paused to release a sub-sampling. Then, the preview operation is resumed to capture an image. The image processor 204 may be included in the control unit 200.

The display unit 206 displays status information generated during operations, numerals and characters, moving images and still images, messages, and so on. Specifically, the display unit 206 displays the image signal inputted from the image processor 204 under control of the control unit 200. The input unit 208 includes a plurality of function keys to provide key input data that corresponds to a key pressed by the user to the control unit 200.

The memory unit 210 includes a program memory (not shown), a data memory (not shown), and a nonvolatile memory (not shown). The program memory stores a program for controlling an overall operation of the mobile terminal. Specifically, the program memory stores a program for pausing the preview operation when an image is captured and resuming the preview operation. Flash memory may be used as the program memory. The data memory temporarily stores data generated during operations. A Random Access Memory (RAM) may be used as the data memory. The nonvolatile memory stores system parameters and backup data.

Figure 3:
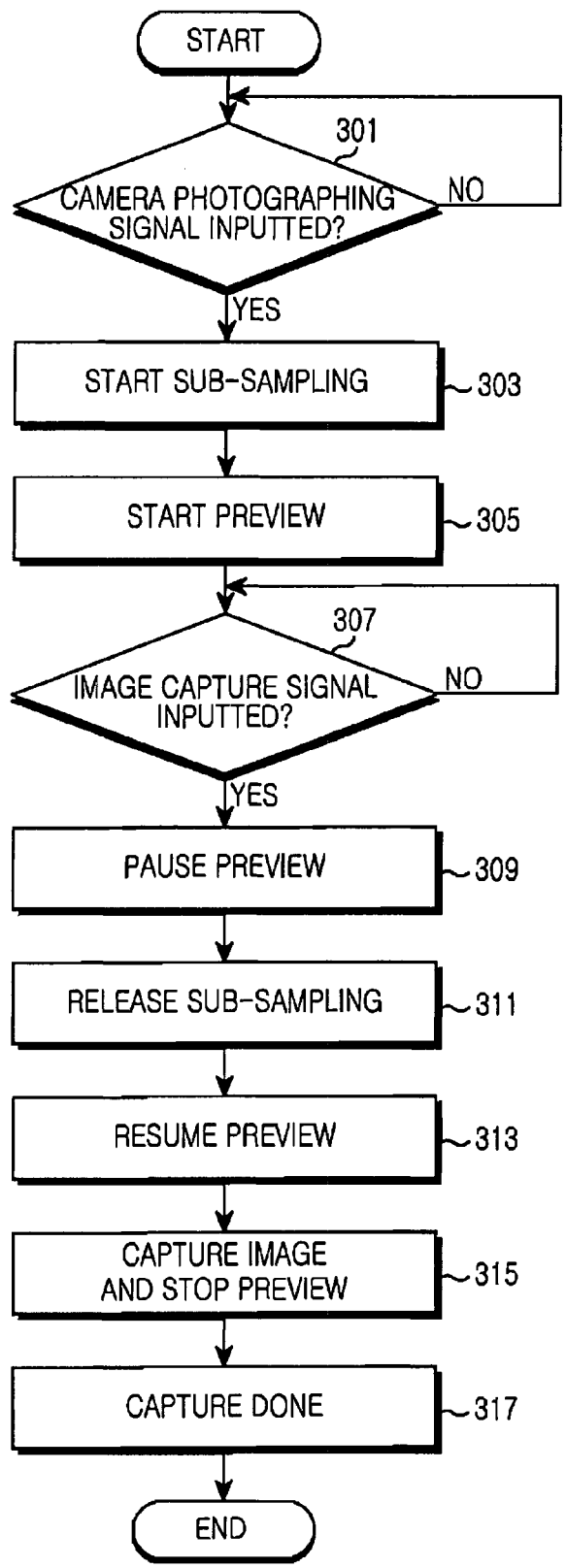
FIG. 3 is a flowchart illustrating an image capturing process of a mobile terminal according to the present invention.

FIG. 3 is a flowchart illustrating an image capturing process in a mobile terminal according to the present invention.

Referring to FIG. 3, the image processor 204 determines whether there is an input in step 301 of a camera photographing signal. When the camera photographing signal is input, the image processor 204 starts a sub-sampling in step 303, so that a vertical resolution of an image signal inputted through the camera sensor is lowered. In step 305, the preview operation is started by displaying all frames of the image signal with a lowered resolution.

In step 307, the image processor 204 determines whether there is an input of an image capture signal for taking a still image. When the image capture signal is input, the image processor 204 pauses the preview operation in step 309 and in step 311, releases the sub-sampling. The pause of the preview operation means that an image signal inputted through the camera sensor is processed and coded on a frame basis and the processed image signal is ignored so that it is not displayed on the display unit 206.

In step 313, the image processor 204 resumes the paused preview operation. The method of pausing and resuming the preview operation has an advantage in that an additional time is unnecessary compared with the method of stopping and restarting the preview operation. That is, in the case of stopping the preview operation, the process of initializing and stabilizing the camera sensor is necessary. However, in the case of pausing the preview operation, the process of initializing and stabilizing the camera sensor is unnecessary. Thus, the present invention can minimize delay time.

In step 315, the image processor 204 performs an image capturing process for taking a still image input through the camera sensor and simultaneously pauses the resumed preview operation. The image processor 204 can minimize a difference between the captured image and the stopped preview operation image by displaying the image signal inputted through the camera sensor just before capturing the image.

in step 317, when the image capturing process is completed, the mobile terminal terminates the process.

Figure 4:
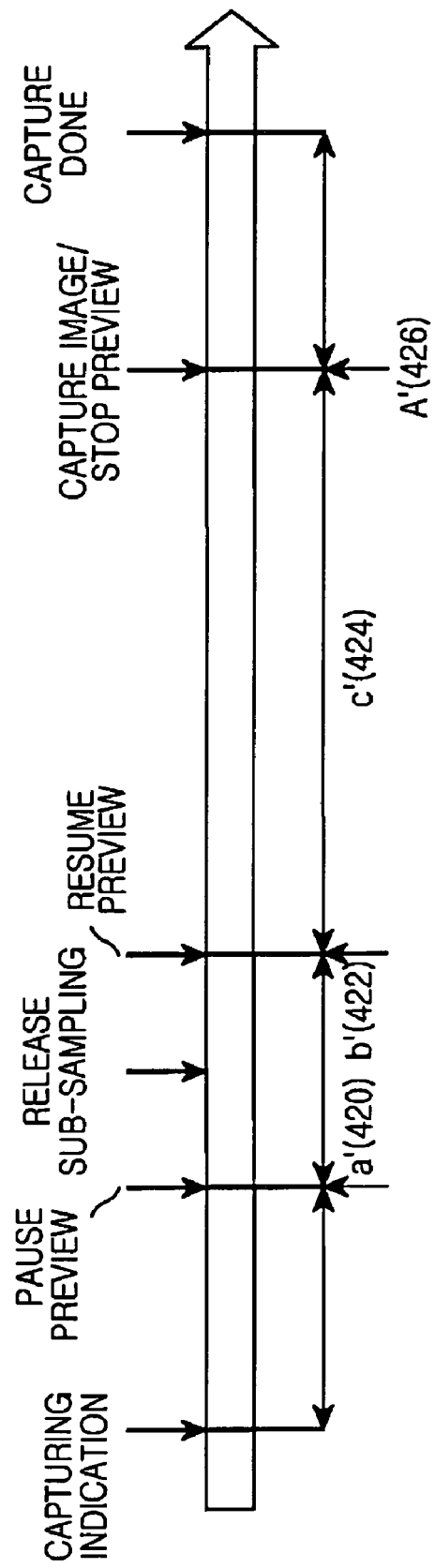
FIG. 4 is a flowchart illustrating an image capturing process of a mobile terminal according to the present invention.

FIG. 4 is a flowchart illustrating the image capturing process of the mobile terminal according to the present invention.

Referring to FIG. 4, while the preview operation, according to the related art, is stopped during period "a" 120 and period "b" 122, the preview operation according to the present invention is stopped during period "a'" 420 and period "b'" 422, which are shorter than the related art, because the preview is paused and resumed before capturing the image. In addition, according to the related art, the preview operation is stopped at time point A 124 and an image is captured at time point B 126. Thus, the time difference between the captured image and the stopped image is large. However, according to the present invention, the preview operation is resumed during period "c'" 424, which is a partial period of the period "b" 122. Then, an image is captured at time point "A'" 426 and the preview is stopped at the same time. Therefore, the difference between the preview time point and the capture time point can be reduced.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, the mobile terminal can minimize the difference between the preview operation stop time and the capture time, which may be generated by the data processing time increased during capturing the image at high pixel resolution. Therefore, the mobile terminal can provide the captured image naturally.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An image capturing method for use in a mobile terminal, comprising the steps of:
    when an image capture menu is selected during a preview operation, pausing the preview operation;
    releasing, during the paused preview operation, an image sub-processing of the preview operation;
    resuming the paused preview operation; and
    capturing the image and stopping the resumed preview operation at the same time,
    wherein resuming the paused preview operation does not include initializing and stabilizing a camera sensor and resuming a stopped preview operation requires initializing and stabilizing the camera sensor.

2. The image capturing method of claim 1, wherein the image sub-processing is at least one of a sub-sampling operation, an omitting operation, and a windowing operation.

3. An image capturing method for use in a mobile terminal, comprising the steps of:
    when an image capturing menu is selected during a preview operation, pausing the preview operation;
    resuming the paused preview operation by processing entire input image signals; and
    capturing the image and stopping the resumed preview operation at the same time,
    wherein resuming the paused preview operation does not include initializing and stabilizing a camera sensor and resuming a stopped preview operation requires initializing and stabilizing the camera sensor.

4. An image capturing apparatus for use in a mobile terminal, comprising:
    a camera module for outputting an image signal inputted through a camera sensor;
    a display unit for displaying the input image signal;
    a control unit for detecting an image capture event to output an image capture signal; and
    an image processor for performing a preview operation by outputting an inputted image signal to the display unit, pausing the preview operation when the image capture signal is input, releasing, during the paused preview operation, an image sub-processing performed during the preview operation, resuming the paused preview operation, and capturing the image and stopping the resumed preview operation at the same time,
    wherein resuming the paused preview operation does not include initializing and stabilizing a camera sensor and resuming a stopped preview operation requires initializing and stabilizing the camera sensor.

5. The apparatus of claim 4, wherein the image sub-processing is at least one of a sub-sampling operation, an omitting operation, and a windowing operation.

6. A mobile terminal comprising:
    means for pausing a preview operation when an image capture menu is selected during the preview operation;
    means for releasing, during the paused preview operation, an image sub-processing of the preview operation; and
    means for resuming the paused preview operation; and
    means for capturing the image and stopping the resumed preview operation at the same time,
    wherein resuming the paused preview operation does not include initializing and stabilizing a camera sensor and resuming a stopped preview operation requires initializing and stabilizing the camera sensor.

7. The mobile terminal of claim 6, wherein the image sub-processing is at least one of a sub-sampling operation, an omitting operation, and a windowing operation.

8. A mobile terminal comprising:
    means for pausing a preview operation when an image capturing menu is selected during the preview operation;
    means for resuming the paused preview operation by processing entire input image signals; and
    means for capturing the image and stopping the resumed preview operation at the same time,
    wherein resuming the paused preview operation does not include initializing and stabilizing a camera sensor and resuming a stopped preview operation requires initializing and stabilizing the camera sensor.

9. A mobile terminal for image capturing comprising:
    a camera module for outputting an image signal;
    a display unit for displaying the image signal;
    a control unit for pausing a preview operation when an image capture signal is inputted, releasing, during the paused preview operation, an image sub-processing performed during the preview operation, resuming the paused preview operation, and capturing the image and stopping the resumed preview operation at the same time,
    wherein resuming the paused preview operation does not include initializing and stabilizing a camera sensor and resuming a stopped preview operation requires initializing and stabilizing the camera sensor.

10. The mobile terminal of claim 9, wherein the image sub-processing is at least one of a sub-sampling operation, an omitting operation, and a windowing operation.

11. A non-transitory computer-readable recording medium having recorded thereon a program for providing an image capturing method in a mobile communication terminal, comprising:
    a first code segment, for pausing a preview operation when an image capturing menu is selected during the preview operation; and
    a second code segment, for resuming the paused preview operation by processing entire input image signals; and
    a third code segment, for capturing the image and stopping the resumed preview operation at the same time,
    wherein resuming the paused preview operation does not include initializing and stabilizing a camera sensor and resuming a stopped preview operation requires initializing and stabilizing the camera sensor.

12. A non-transitory computer-readable recording medium having recorded thereon a program for providing an image capturing method in a mobile communication terminal, comprising:
    a first code segment, for pausing a preview operation when an image capturing menu is selected during the preview operation;
    a second code segment, for releasing, during the paused preview operation, an image sub-processing of the preview operation;
    a third code segment, for resuming the preview operation; and a fourth code segment, for capturing the image and stopping the resumed preview operation at the same time, wherein resuming the paused preview operation does not include initializing and stabilizing a camera sensor and resuming a stopped preview operation requires initializing and stabilizing the camera sensor.

* * * * *